(12) United States Patent
Lemish et al.

(10) Patent No.: US 7,991,389 B1
(45) Date of Patent: Aug. 2, 2011

(54) DISPATCH COMMUNICATION FORWARDING

(75) Inventors: Michael Lee Lemish, Great Falls, VA (US); Manish Sharma, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 1261 days.

(21) Appl. No.: 11/314,417

(22) Filed: Dec. 22, 2005

Related U.S. Application Data

(60) Provisional application No. 60/638,194, filed on Dec. 23, 2004.

(51) Int. Cl.
*H04M 3/42* (2006.01)

(52) U.S. Cl. .................. 455/417; 455/520; 370/335

(58) Field of Classification Search .......... 455/461, 455/456.1, 456.3, 456.6, 457, 458, 517, 519, 455/414.1, 415, 417, 518, 521; 370/335
See application file for complete search history.

(56) References Cited

U.S. PATENT DOCUMENTS

| | | | | |
|---|---|---|---|---|
| 4,926,495 A | * | 5/1990 | Comroe et al. | 455/508 |
| 5,711,011 A | * | 1/1998 | Urs et al. | 455/520 |
| 6,148,064 A | * | 11/2000 | Christensen et al. | 379/88.12 |
| 6,295,447 B1 | * | 9/2001 | Reichelt et al. | 455/417 |
| 7,113,864 B2 | * | 9/2006 | Smith et al. | 701/117 |
| 7,328,042 B2 | * | 2/2008 | Choksi | 455/552.1 |
| 7,359,726 B2 | * | 4/2008 | Choksi | 455/519 |
| 7,359,731 B2 | * | 4/2008 | Choksi | 455/552.1 |
| 2002/0087263 A1 | * | 7/2002 | Wiener | 701/207 |
| 2002/0177437 A1 | * | 11/2002 | Chesavage et al. | 455/426 |
| 2002/0197994 A1 | * | 12/2002 | Harris et al. | 455/445 |
| 2004/0002351 A1 | * | 1/2004 | Upp et al. | 455/519 |
| 2004/0156495 A1 | * | 8/2004 | Chava et al. | 379/392 |
| 2005/0054375 A1 | * | 3/2005 | Patel et al. | 455/552.1 |
| 2006/0063486 A1 | * | 3/2006 | McClendon | 455/15 |
| 2006/0072517 A1 | * | 4/2006 | Barrow et al. | 370/335 |

* cited by examiner

*Primary Examiner* — Kent Chang
*Assistant Examiner* — Dinh P Nguyen

(57) ABSTRACT

Systems and methods for forwarding dispatch communications are provided. A dispatch communication forwarding request is sent to a dispatch processor or a dispatch communication forwarding server. A record associated with the dispatch station initiating the dispatch communication forwarding request is updated in a home location register to indicate that dispatch communications intended for the dispatch station should be forwarded to another dispatch station. The communication forwarding can be absolute such that all communications intended for one dispatch station are forwarded to another dispatch station. Alternatively, the communication forwarding can be conditional such that all dispatch communications meeting certain criteria intended for one dispatch station are forwarded to another dispatch station.

14 Claims, 3 Drawing Sheets

DISPATCH COMMUNICATION FORWARDING

Figure 1A:
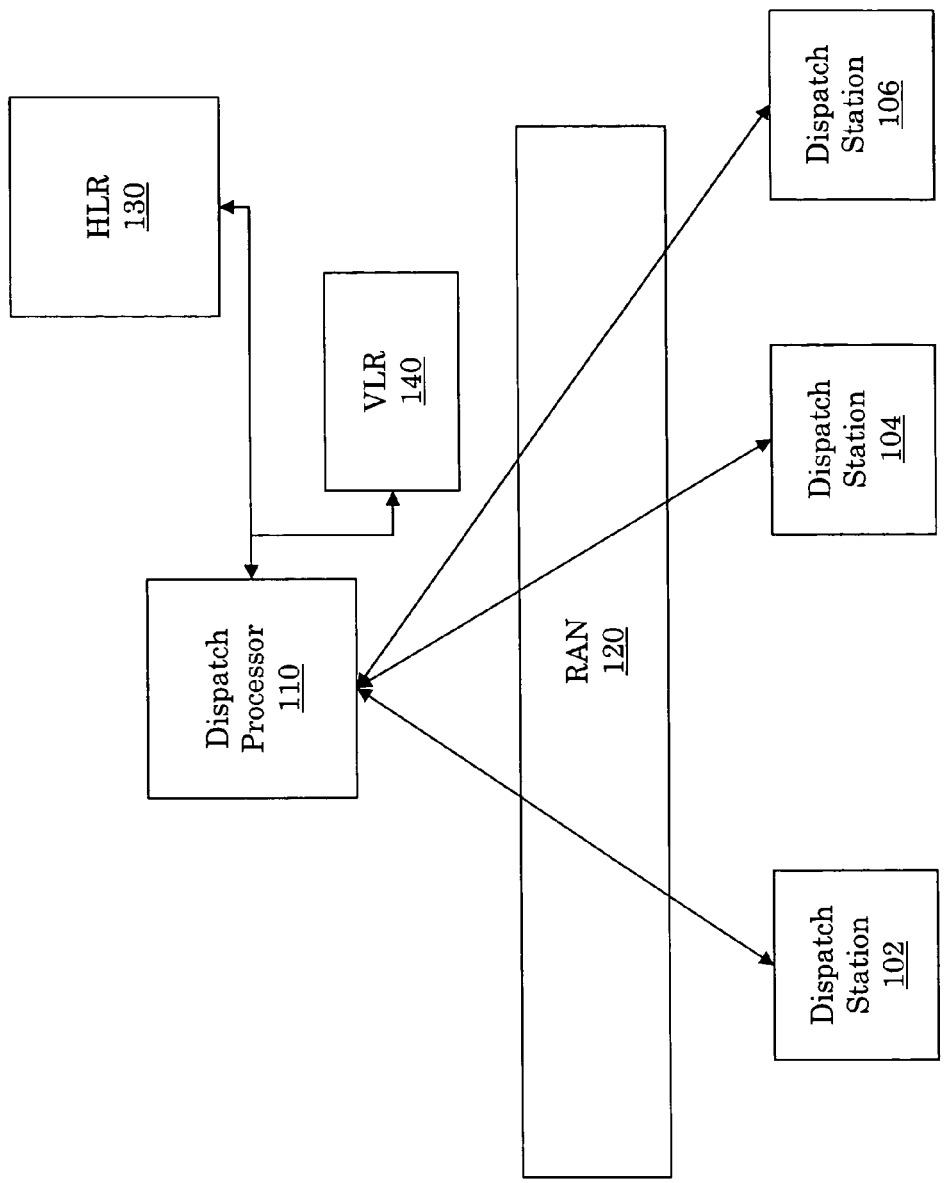

This application claims priority under 35 U.S.C. §119 to U.S. Provisional Application No. 60/638,194, filed Dec. 23, 2004, the entire disclosure of which is herein expressly incorporated by reference.

BACKGROUND OF THE INVENTION

Wireless communications systems, such as cellular communication systems, typically provide interconnect and/or dispatch voice communication services. Interconnect voice communication services are those typically provided by most wireless carriers as circuit-switched communications. Dispatch communication services are commonly known as a push-to-talk (PTT) or walkie-talkie type of communication such as Sprint Nextel Corporation's service identified by the trade name Direct Connect.

While wireless interconnect voice communication networks have typically been implemented with services similar to those provided by wireline voice communication networks, wireless dispatch communication networks typically have not provided many services provided by wireline voice communication networks. For example, while voice mail has been available in wireless interconnect and wireline voice networks, voice mail has not been made available in dispatch communication networks. Implementing services typically provided in wireless interconnect and wireline voice networks require changes to network elements and procedures of dispatch communication networks.

SUMMARY OF THE INVENTION

Systems and methods for forwarding dispatch communications are provided. A dispatch communication forwarding request is sent to a dispatch processor or a dispatch communication forwarding server. A record associated with the dispatch station initiating the dispatch communication forwarding request is updated in a home location register to indicate that dispatch communications intended for the dispatch station should be forwarded to another dispatch station.

The dispatch communication forwarding can be absolute such that all communications intended for one dispatch station are forwarded to another dispatch station. Alternatively, the communication forwarding can be conditional such that all dispatch communications meeting certain criteria intended for one dispatch station are forwarded to another dispatch station. The dispatch communication forwarding allows a person with multiple stations, such as personal and work dispatch stations, to forward dispatch communications between the multiple stations in accordance with certain variable criteria, such as forwarding dispatch communication from the personal dispatch station to the work dispatch station during the week, and then carry the personal dispatch station on the weekends, without receiving work communications.

Other objects, advantages and novel features of the present invention will become apparent from the following detailed description of the invention when considered in conjunction with the accompanying drawings.

BRIEF DESCRIPTION OF THE DRAWING FIGURES

Figure 1B:
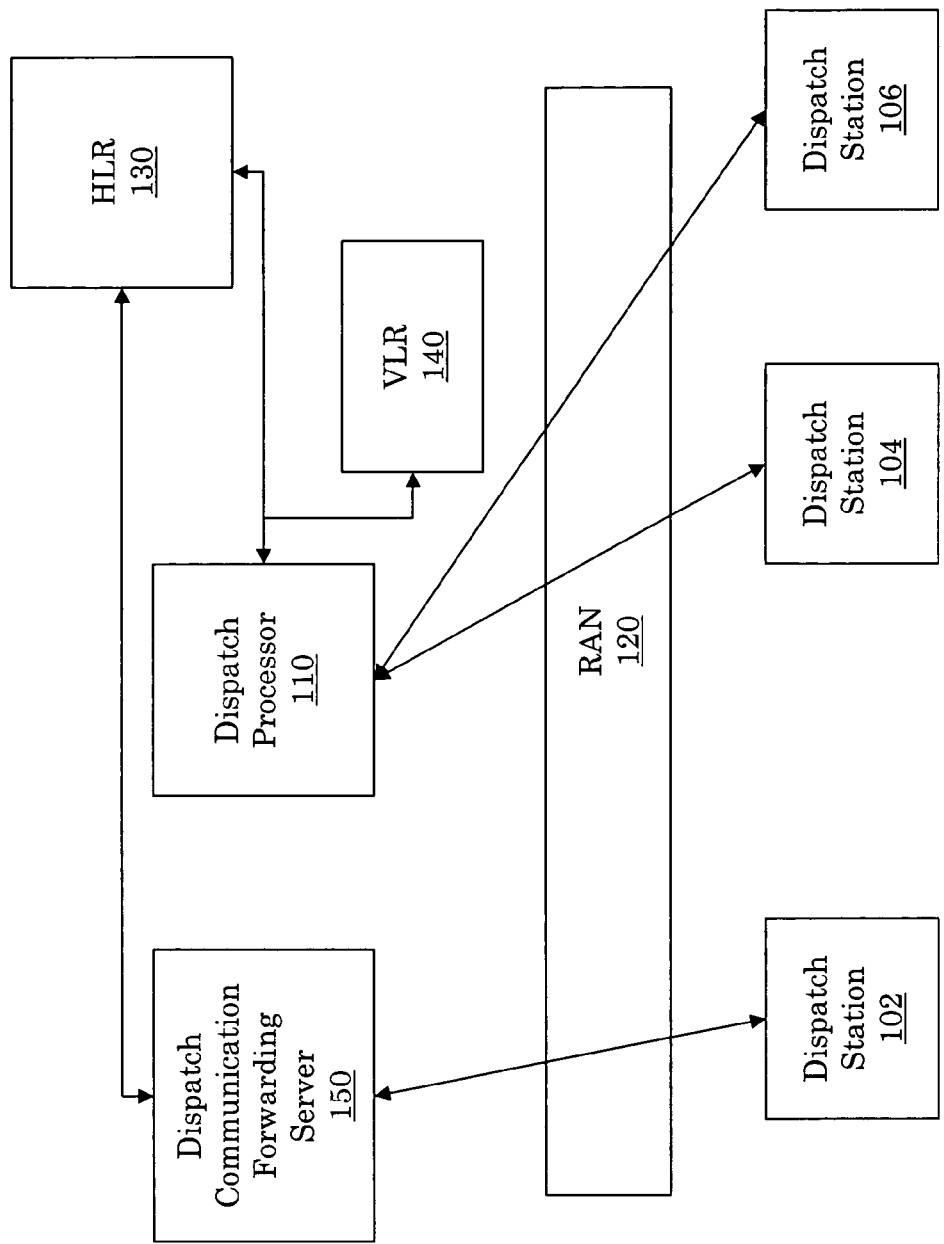
Figure 1C:
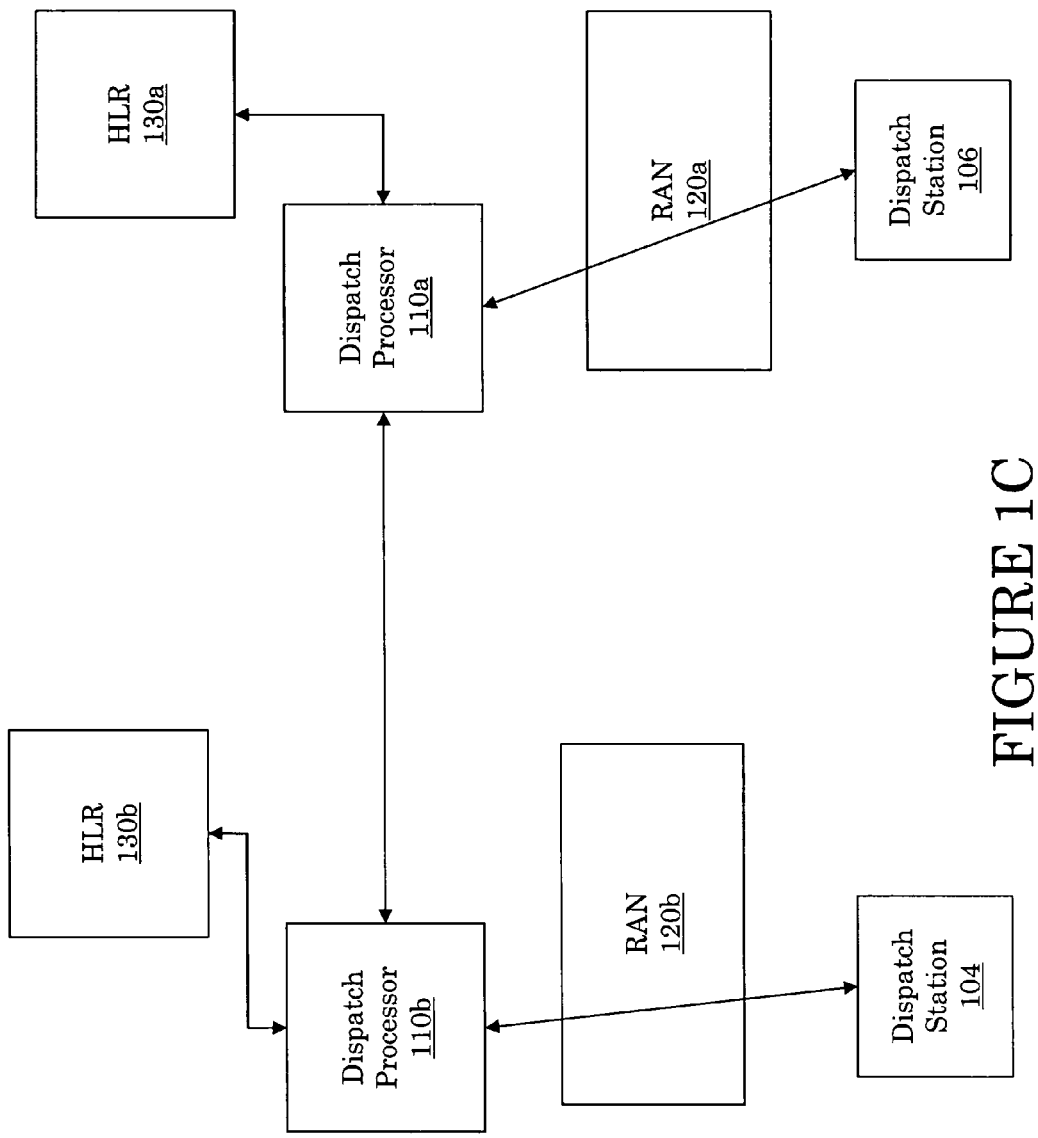

FIGS. 1A-1C illustrate exemplary systems for providing dispatch communication forwarding in accordance with the present invention.

DETAILED DESCRIPTION OF THE PREFERRED EMBODIMENTS

FIG. 1A illustrates an exemplary system for providing dispatch communication forwarding in accordance with one embodiment of the present invention. The system includes dispatch stations 102-106, which are coupled to a dispatch processor 110 via radio access network (RAN) 120. The dispatch processor is coupled to a home location register (HLR) 130 and visitor location register (VLR) 140. The dispatch stations 102-106 can be fixed or mobile dispatch stations. Fixed dispatch stations include dispatch consoles, a computer running a dispatch communication program, or the like. Mobile dispatch stations include wireless phones, personal digital assistants (PDAs), or the like. Accordingly, someone who has both fixed and mobile dispatch stations can have dispatch communications intended for the mobile dispatch station forwarded to the fixed dispatch station when the person is at the fixed dispatch station, and communications intended for the fixed dispatch station forwarded to the mobile dispatch station when the person is away from the fixed dispatch station.

Dispatch communications have typically been provided in both private and public networks. Private dispatch networks typically cover very limited geographic areas (e.g., a city or a portion of a city), support a limited number of dispatch stations and have a relatively simple network infrastructure. In contrast, public networks that provide dispatch communications typically cover large geographic areas (e.g., portions of one or more states), support a far larger number of dispatch stations and involve a more complex network infrastructure. The more complex infrastructure of public networks compared to private networks is due, in part, to the mobility (e.g., the ability to move between wireless sites in different geographic areas) provided by public networks. This mobility is provided using home location registers and visitor location registers. In addition, compared to private networks that typically only support dispatch communications, public networks can support both dispatch and interconnect communications.

One type of public network which provides interconnect and dispatch communications is the iDEN network, such as that owned and operated by Sprint Nextel Communications Corp. of Reston, Va. Accordingly, in an iDEN network the dispatch processor 110 would be a dispatch application processor (DAP) and the HLR 130 would be an iDEN HLR (iHLR). Implementing dispatch communication forwarding in the iDEN network requires the DAP and VLR to recognize a new call type, i.e., the dispatch communication forwarding call type.

Assume that a user of dispatch station 102 wants to have dispatch communications forwarded to dispatch station 104. The user of dispatch station 102 accesses a graphical user interface (GUI) on the dispatch station to provide an identifier of dispatch station 104. In the iDEN network dispatch identifiers are known as Universal Fleet Mobile Identifiers (UFMIs). The identifier of dispatch station 104 is provided in a dispatch communication forwarding request to dispatch processor 110. The dispatch communication forwarding request can be provided over a random access channel (RACH), traffic channel (TCH), or any other uplink wireless channel. Alternatively, or additionally, the identifier of dispatch station 104 can be provided via an interactive voice response service, to an operator, using a computer (e.g. by accessing a web page), and/or the like.

Dispatch processor 110 sends the request for dispatch communication forwarding to HLR 130 using, for example, mobile application part (MAP) protocol. HLR 130 updates its records for the subscriber to indicate that dispatch communications destined for mobile station 102 should be forwarded to dispatch station 104. The dispatch communication forwarding information may also be stored in dispatch processor 110, because dispatch communications between dispatch stations supported by the same dispatch processor may not result in a query to the HLR.

Assume that dispatch station 106 initiates a dispatch communication to dispatch station 102. Dispatch processor 110 receives the dispatch communication request and access records for dispatch station 102, which are either stored in the dispatch processor or are obtained from HLR 130. Using the records for dispatch station 102, the dispatch processor 110 determines an identifier for dispatch station 104 and forwards the dispatch communication request to dispatch station 104.

FIG. 1B illustrates an exemplary system for providing dispatch communication forwarding in accordance with another embodiment of the present invention. The system of FIG. 1B is similar to that described above in connection with FIG. 1A, and hence, only the differences between the systems will be described. In the system of FIG. 1B, a dispatch communication forwarding server 150 is provided for receiving the dispatch communication forwarding request, and forwarding the request to the HLR 130. The dispatch communication forwarding server 150 interacts with the HLR 130 using the HLR's application programming interface (API). The dispatch station can communicate directly with dispatch communication forwarding server 150 using, for example, a wireless packet data network. Alternatively, the dispatch station can communicate with the dispatch communication forwarding server 150 by accessing the internet via a wireless packet data network, e.g., via a web address such as forwarding_server@carrier.com, via an interactive voice response service, an operator, or the like.

After the HLR 130 has updated its own records, HLR 130 can distribute the dispatch communication forwarding information to the dispatch processor 110. Alternatively, or additionally, the information can be forwarded to dispatch processor 110 when the dispatch processor 110 receives a dispatch communication intended for dispatch station 102, and requests information associated with dispatch station 102 from HLR 130. The dispatch communication forwarding server 150 can also forward the information related to the dispatch communication forwarding request directly to the dispatch processor 110.

FIG. 1C illustrates an exemplary system for providing communication forwarding of dispatch communications in accordance with the present invention. Specifically, FIG. 1C illustrates the system when a dispatch communication request is sent to the HLR of the dispatch station identified in the request, but the forwarded dispatch station is supported by a different HLR. For example, if dispatch station 102 (not illustrated) has its information stored in HLR 130*a*, and dispatch station 106 sends a dispatch communication request for a dispatch communication with dispatch station 102, the request is initially routed to HLR 130*a* to identify the last registered location of dispatch station 102. HLR 130*a* responds to the request identifying that dispatch communication forwarding has been activated for dispatch station 102, and that the dispatch communication request should be forwarded to dispatch station 104, which has its information stored in HLR 130*b*. Accordingly, a request for the last registered location of dispatch station 104 is sent to HLR 130*b*, which responds by identifying dispatch processor 110*b* as supporting dispatch station 104. The dispatch communication request is then forwarded to dispatch processor 110*b* to setup the dispatch communication.

The dispatch communication forwarding can be absolute or conditional. An absolute dispatch communication forwarding forwards all dispatch communications to the forwarded dispatch station. A conditional dispatch communication forwarding forwards dispatch communications which match predefined criteria to the forwarded dispatch station. These criteria can include calling dispatch station identifier, time of day, day of the week, communication type, (e.g., call alerts, private calls, group calls and selective dynamic group calls), and/or the like.

Although the dispatch communication forwarding has been described in connection with forwarding only communications for a single dispatch station to another dispatch station, the present invention can also forward dispatch communications for a number of dispatch stations to the same dispatch station. This may be useful, for example, when a group is traveling together and each member does not want to carry a separate dispatch station. This would allow one member of the group to carry a dispatch station, and communications to the other dispatch stations will be forwarded to the dispatch station carried by the one member of the group.

Although the present invention has been described in connection with an iDEN network, the present invention is equally applicable to any type of network which supports dispatch communications.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for forwarding dispatch communications intended for a first dispatch station to a second dispatch station, the method comprising the acts of:

receiving, by a dispatch processor or a dispatch communication forwarding server from the first dispatch station, a communication forwarding request for the first dispatch station that indicates a forwarding address for dispatch communications intended for the first dispatch station;

updating a record for the first dispatch station to indicate the forwarding address for dispatch communications intended for the first dispatch station, wherein the record is located in a home location register and the dispatch processor, the dispatch processor is arranged to recognize a dispatch call forwarding call type, and the dispatch processor updates the record in response to receipt of the communication forwarding request or in response to information sent from the dispatch communication forwarding server;

receiving, by the dispatch processor, a dispatch communication request for the first dispatch station; and establishing, by the dispatch processor, a dispatch communication with a dispatch station associated with the forwarding address, wherein the first dispatch station is not involved in the established dispatch communication.

2. The method of claim 1, wherein the communication forwarding request is received by the dispatch processor.

3. The method of claim 1, wherein the communication forwarding request is received by the dispatch communication forwarding server.

4. The method of claim 1, wherein when the dispatch communication request for the first dispatch station is received, the method comprises the acts of:

accessing the record for the first dispatch station; and
determining the forwarding address.

5. A method for forwarding dispatch communications intended for a first dispatch station to a second dispatch station, the method comprising the acts of:
sending a communication forwarding request for the first dispatch station to a dispatch network;
updating a record for the first dispatch station to indicate a forwarding address for dispatch communications intended for the first dispatch station wherein the record is located in a home location register and the dispatch processor, the dispatch processor is arranged to recognize a dispatch call forwarding call type, and the dispatch processor updates the record in response to receipt of the communication forwarding request or in response to information sent from a dispatch communication forwarding server;
receiving a dispatch communication request for the first dispatch station;
determining, by the dispatch processor after receiving the dispatch communication request, that the record stored in one of the home location register and the dispatch processor for first dispatch station indicates that dispatch communication forwarding is conditional;
establishing, by the dispatch processor, a dispatch communication with a dispatch station associated with the forwarding address when the condition is satisfied; and
establishing, by the dispatch processor, a dispatch communication with the first dispatch station when the condition is not satisfied.

6. The method of claim 5, wherein the dispatch communication forwarding is conditional on a time of day, day of a week, or calling dispatch station identifier.

7. The method of claim 1, wherein the dispatch network is a public communication network.

8. A method for dispatch communications, the method comprising the acts of:
updating a record for a second dispatch station to indicate a forwarding address for dispatch communications intended for the second dispatch station wherein the record is located in a home location register and a dispatch processor, the dispatch processor is arranged to recognize a dispatch call forwarding call type, and the dispatch processor updates the record in response to receipt of a communication forwarding request or in response to information sent from a dispatch communication forwarding server;
receiving a dispatch communication request from a first dispatch station for the second dispatch station;
determining that dispatch communications for the second dispatch station are subject to a dispatch communication forwarding service; and
establishing a dispatch communication between the first dispatch station and another dispatch station in accordance with the dispatch communication forwarding service, wherein the establishing the dispatch communication comprises accessing a home location register of the another dispatch station to determine a location of the another dispatch station, and wherein the second dispatch station is not involved in the established dispatch communication.

9. The method of claim 8, wherein the act of determining that the dispatch communications are subject to a dispatch communication forwarding service, comprises the act of:
determining that a condition of the dispatch communication forwarding service is satisfied.

10. The method of claim 9, wherein the condition is a time of day, day of a week, or calling dispatch station identifier.

11. The method of claim 8, further comprising the acts of:
receiving a dispatch communication request from a third dispatch station for a fourth dispatch station;
determining that dispatch communications for the fourth dispatch station are subject to a dispatch communication forwarding service; and
establishing a dispatch communication between the third dispatch station and the another dispatch station in accordance with the dispatch communication forwarding request.

12. The method of claim 8, wherein the determination that dispatch communications are subject to a dispatch communication forwarding service is based on the record in the home location register.

13. The method of claim 8, wherein the determination that dispatch communications are subject to a dispatch communication forwarding service is based on the record in the dispatch processor.

14. The method of claim 8, wherein the home location register of the another dispatch station is different from a home location register of the second dispatch station.

\* \* \* \* \*